Aug. 12, 1930.  G. A. ENGLUND  1,773,034
CHUCK
Filed Jan. 23, 1928

INVENTOR
Gustaf A. Englund.
by
Arthur B. Jenkins.
ATTORNEY

Patented Aug. 12, 1930

1,773,034

UNITED STATES PATENT OFFICE

GUSTAF A. ENGLUND, OF WEST HARTFORD, CONNECTICUT, ASSIGNOR TO THE JACOBS MANUFACTURING COMPANY, OF HARTFORD, CONNECTICUT, A CORPORATION OF CONNECTICUT

CHUCK

Application filed January 23, 1928. Serial No. 248,833.

My invention relates to that class of chucks more particularly employed for holding drills and analogous tools for boring and similar actions, and an object of my invention, among others, is to provide a device of this class having means for preventing unintentional loosening of the clamping jaws upon the tool.

One form of device embodying my invention and in the construction and use of which the objects herein set out, as well as others, may be attained, is illustrated in the accompanying drawings, in which—

Figure 1:
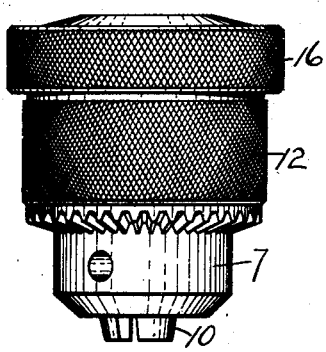
Figure 1 is a side view of my improved chuck.
Figure 2:
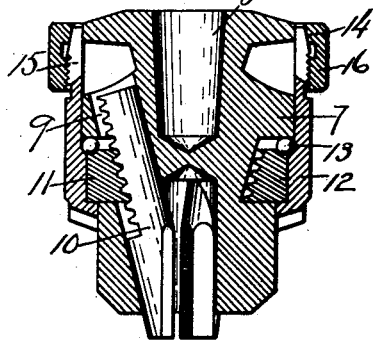
Figure 2 is a view in central lengthwise section through the same.
Figure 3:
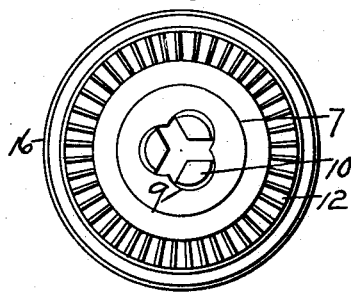
Figure 3 is a bottom view.
Figure 4:
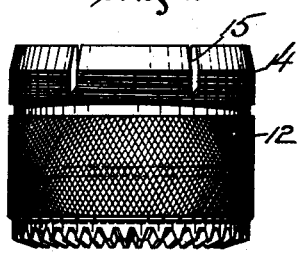
Figure 4 is a detail side view of the clamping sleeve.
Figure 5:
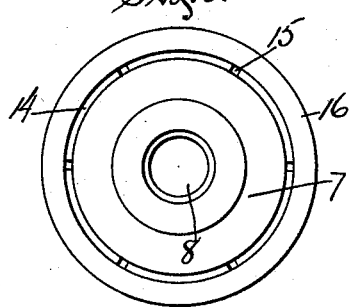
Figure 5 is a view looking at the opposite end of the chuck from that shown in Figure 3.
Figure 6:
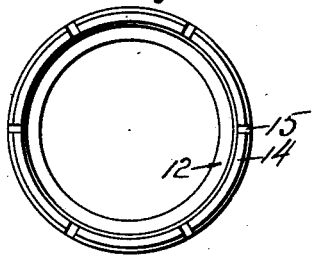
Figure 6 is a top view of the clamping sleeve.

In the accompanying drawings the numeral 7 denotes the body of my improved chuck that may be of any ordinary form and construction having a tapered hole 8 at one end to receive a drill spindle and also having openings 9 for chuck jaws 10 that are longitudinally movable in said openings as by means of a feed nut 11 located in an annular groove in the body and screw threaded to engage the screw-threaded edges of the jaws, as shown in Fig. 2. The nut, as is usual in structures of this class, may be in halves to enable it to be located in the groove in the body, and it is secured to a clamping sleeve 12 in any suitable manner. Ball bearings 13 may be employed if desired between one side of the groove in the body and the nut 11 to facilitate the movement of the nut in the groove.

The structure thus far described is generally of old and well-known construction. In such structures there is a tendency, unless means are supplied for preventing it, for the sleeve 12 to work loose, that is, to rotate slightly and thereby loosen the grip of the clamping jaws 10 upon the shank of the drill or other similar tool. To avoid this I provide an extension 14 at the upper edge of the sleeve 12, this extension terminating preferably near the upper end of the body 7. This extension is beveled, and slots 15 are formed at suitable intervals around the extension. The extension is also threaded to receive the threads on the interior of a locking collar or sleeve 16 having its inner surface beveled to contact with the beveled surface of the sleeve and as shown in Fig. 2 of the drawings.

From this it will be noted that after the jaws 10 are clamped by the action of the sleeve 12 against the shank of a drill, the locking collar 16 may be employed to secure the sleeve 12 against rotating movement. This will be accomplished by turning the collar 16 downwardly on its thread, thus contracting the extension 14 tightly against the body of the chuck, thereby securing it in place.

In accordance with the provisions of the patent statutes I have described the principles of operation of my invention, together with the device which I now consider to represent the best embodiment thereof, but I desire to have it understood that the device shown is only illustrative and that the invention may be carried out by other means and applied to uses other than those above set out.

I claim—

1. A chuck including a body, jaws movable therein, a clamping sleeve engaged with said jaws for operating them, an extension on said sleeve, means for rendering said extension contractible, and means for contracting said extension to clamp the sleeve against said body.

2. A chuck including a body, jaws movable therein, a clamping sleeve movably mounted on the body and engaged with said jaws for operating them, a slotted threaded beveled extension on said sleeve, and a locking collar threaded to fit the thread on said extension and having a beveled surface to engage the beveled portion of said extension to clamp said sleeve to said body.

GUSTAF A. ENGLUND.